United States Patent
Moussa

(10) Patent No.: US 9,881,004 B2
(45) Date of Patent: Jan. 30, 2018

(54) GENDER AND NAME TRANSLATION FROM A FIRST TO A SECOND LANGUAGE

(71) Applicant: CERNER INNOVATION, INC., Kansas City, KS (US)

(72) Inventor: Ahmed Sayed Attia Moussa, Quseir (EG)

(73) Assignee: CERNER INNOVATION, INC., Kansas City, KS (US)

( * ) Notice: Subject to any disclaimer, the term of this patent is extended or adjusted under 35 U.S.C. 154(b) by 49 days.

(21) Appl. No.: 14/876,257

(22) Filed: Oct. 6, 2015

(65) Prior Publication Data

US 2016/0321247 A1 Nov. 3, 2016

Related U.S. Application Data

(60) Provisional application No. 62/155,843, filed on May 1, 2015.

(51) Int. Cl.
*G06F 17/27* (2006.01)
*G06F 17/28* (2006.01)
*G06F 9/455* (2006.01)

(52) U.S. Cl.
CPC ........ *G06F 17/2836* (2013.01); *G06F 17/289* (2013.01); *G06F 17/2818* (2013.01); *G06F 17/2863* (2013.01)

(58) Field of Classification Search
CPC ........... G06F 17/27; G06F 17/28; G06F 9/455
USPC .................................... 704/2, 7, 9
See application file for complete search history.

(56) References Cited

U.S. PATENT DOCUMENTS

| | | | | |
|---|---|---|---|---|
| 8,041,560 | B2* | 10/2011 | Hermansen | G06F 17/30634 704/1 |
| 8,140,557 | B2* | 3/2012 | Dettinger | G06F 17/3056 707/756 |
| 2005/0119875 | A1* | 6/2005 | Shaefer, Jr. | G06F 17/30675 704/7 |
| 2008/0288235 | A1* | 11/2008 | Dettinger | G06F 17/3056 703/23 |
| 2008/0312909 | A1* | 12/2008 | Hermansen | G06F 17/30634 704/9 |
| 2012/0016663 | A1* | 1/2012 | Gillam | G06F 17/30634 704/9 |

(Continued)

OTHER PUBLICATIONS

Gallagher et al., "Estimating age, gender, and identity using first name priors." Computer Vision and Pattern Recognition, 2008. CVPR 2008. IEEE Conference on. IEEE, 2008.*

*Primary Examiner* — Seong Ah A Shin
(74) *Attorney, Agent, or Firm* — Shook, Hardy & Bacon L.L.P.

(57) ABSTRACT

A system and method are provided for inferring person gender and translating people's names into a second language. The present invention translates an individual's name into a required second language to reduce waiting time in registration areas. It also is able to infer gender once the registration clerk enters the individual's first name in a native language. It also prevents duplication of a person's record generated because of the confusion that happens around how a native name is translated into a second language by standardizing such translation. The embodiments of the present invention utilize machine learning and statistical approaches to infer gender and translate an individual's name into a second language.

14 Claims, 11 Drawing Sheets

(56) References Cited

U.S. PATENT DOCUMENTS

2013/0035926 A1\* 2/2013 Ushakov ................. G06F 17/28
704/2
2014/0156261 A1\* 6/2014 Patman Maguire .. G06F 17/278
704/9

\* cited by examiner

| DIACRITICS (SHORT VOWELS) | م (1ST LETTER) | ح (2ND LETTER) | ر (3RD LETTER) | د (4TH LETTER) |
|---|---|---|---|---|
| FATHAH ـَ ةَ | Ma | ha | Ma | da |
| KASRAH ـِ ةِ | Me | he | Me | de |
| DAMMAH ـُ ةُ | Mo | ho | Mo | do |
| SUKUN ـْ | M | h | M | d |
| SHADDAH + FATHAH | Mma | hha | Mma | dda |
| SHADDAH + KASRAH | Mme | hhe | Mme | dde |
| SHADDAH + DAMMAH | Mmo | hho | Mmo | ddo |

QUICK REG

RECORD NO.  LAST NAME  ARABIC FIRST NAME  ARABIC 2ND/3RD/4TH NAME  ARABIC LAST NAME  FIRST NAME  2ND/3RD/4TH NAME

— 1102

LAST NAME  GENDER  AGE  NATIONALITY: SAUDI  ID TYPE  NATIONAL ID/IQAMA/FAMILY CARD

ESTIMATED AGE: NO  DATE OF BIRTH: //****

ID EXPIRY DATE: //****

— PERSON INFO —

MOBILE NUMBER: (05)- -  BUSINESS EXTENSION  HOME PHONE NO.: (01)- -  BUSINESS PHONE NO.: (01)- -  REASON FOR NO PHONE NO.  LANGUAGE: ARABIC

ATTENDING

— ENCOUNTER INFO —

DISPLAY IN LOCATION DIRECTORY?: YES  MODE OF ARRIVAL: SELF  REFERRAL SOURCE  ENCOUNTER TYPE  SERVICE

ADMIT / VISIT REASON  DISASTER EVENT: NO  ARRIVE DATE: 14/04/2014  ARRIVE TIME: 11:23

— LOCATION —

TRACKING GROUP  BUILDING: PMAH MAIN BLDG  REGISTRATION USER ID: AA029930

GENDER AND NAME TRANSLATION FROM A FIRST TO A SECOND LANGUAGE

CROSS-REFERENCE TO RELATED APPLICATIONS

This application claims priority to U.S. Provisional Application No. 62/155,843, filed May 1, 2015, entitled "Gender and Name Translation from A First to A Second Language," the entire contents of which are herein incorporated by reference.

BACKGROUND

Translation is the comprehension of the meaning of a text and the subsequent production of an equivalent text that communicates the same message in another language. However, translation of names or nouns from one language to another is difficult. Dealing with languages that belong to different language families, e.g., Arabic and English languages can complicate name translation even further. Arabic is classified as a member of the Semitic family of languages while English is a member of the Indo-European language family. The Arabic language is considered as the official language spoken in more than 15 countries in the Middle East with 290 million native Arabic speakers.

It can be difficult for native Arabic speakers to translate a name from the native Arabic language into the English language. A single name could have many versions in translation to English. For example, the name "محمد", consists of 4 letters, could have 625 alternatives, and the most common ones are Mohamad, Mohamed, Mohamad, Mohammed, Muhamad, Muhamet, and Muhammet. This complexity may challenge the Arabic speaker when translating a person's name from the native Arabic language into the English language and may cause the person to create duplicate entries for the same individual.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

The claimed invention relates to a system and method supporting a computerized information system. More specifically, the claimed invention relates to a system and method for computer-based information technology to infer person gender and translate a person's name into a second language in a timely, correct, and organized manner in a computer-based system within a facility.

The claimed solution is necessarily rooted in computerized information technology in order to overcome a problem specifically arising in the realm of machine translation, and the claims address the problem of efficiently and correctly inferring person gender and translating a person's name into a second language in a facility computer information network. The claimed invention overcomes the limitations of current computer or machine translation technology and provides other benefits that will become clear to those skilled in the art from the foregoing description.

The claimed system and method of the present application represent a new paradigm of automatically inferring person gender and automatically translating a person's name into a second language in a facility network at high efficiency and accuracy. Not only does the claimed invention automatically infer person gender and automatically translate a person's name into a second language, but it also prevents errors in the entry of the person's gender and the translated names, in comparison to the manual processes, and saves time for the user. Users in different facilities using the claimed invention will notice enhanced performance of inferring person gender and translating a person's name into a second language, fewer user steps during registration, and less user access to the information in the facility databases. Furthermore, anything that reduces the number of "clicks" or entries a computer user has to make results in reducing the memory utilization, CPU cycles, number of operations that need to be performed by the computer, and power consumption. The resulting cost savings and operational efficiencies of a computer, in automatically inferring person gender and automatically translating a person's name into a second language, magnify the potential benefits of this technology.

Embodiments of the present invention provide a system and method for inferring person gender and translating a person's name into a second language. In embodiments, the present invention translates names into a required second language to reduce translation time and waiting time. It also is able to infer person gender once a user enters the person's first name in a native language. It also prevents duplicate record numbers for the individual generated because of the confusion that happens around how a native name is translated into a second language by standardizing such translation. The embodiments of the present invention utilize machine learning and statistical approaches to infer person gender and translate people's names into a second language.

The embodiments of the present invention provide an automatic name translation that helps Arabic users, e.g., registration clerks, to translate names from Arabic to English, helps English users to translate names from English to Arabic, and reduces the amount of time required for translation by 80%. The embodiments of the present invention can be used for automatic name translation from languages other than Arabic to the English language or any other language of interest to the user. The automatic name translation provided by the embodiments of the present invention takes place in real time and at high accuracy and certainty. The embodiments of the present invention also are able to infer person gender once the registration clerk enters the person's first name in a native language.

In one aspect, a method for inferring person gender and translating an individual person's name into a second language involves: collecting different datasets and databases to provide an input dataset, receiving a person's name in a native language, identifying in the input dataset a relationship between the person's name and gender, identifying in the input dataset a relationship between the person's name in the native language and an alternative name in a second language, calculating the frequency for the relationships between the person's name and gender, calculating the frequency for the relationships between the person's name in the native language and the different alternative names in a second language, calculating certainty scores for pairs of the person's name in the native language and a specific alternative name, calculating certainty scores for pairs of a person's name and a specific gender, sorting the different alternative names and genders in a descending order according to the certainty scores, selecting a specific alternative name with the highest certainty score, selecting the gender for the person's name with the highest certainty score, and serializing and storing the results of a selected alternative name and gender of the person's native name. In another aspect, a system for inferring person gender and translating people's names into a second language is provided.

BRIEF DESCRIPTION OF THE DRAWINGS

Embodiments are described in detail below with reference to the attached drawing figures, wherein:

FIG. 10 depicts a table illustrating all possible combinations for Arabic diacritics used on each of the 4 letters; and FIG. 11 depicts a diagram illustrating the different inputs of the registration process.

DETAILED DESCRIPTION

Figure 1:
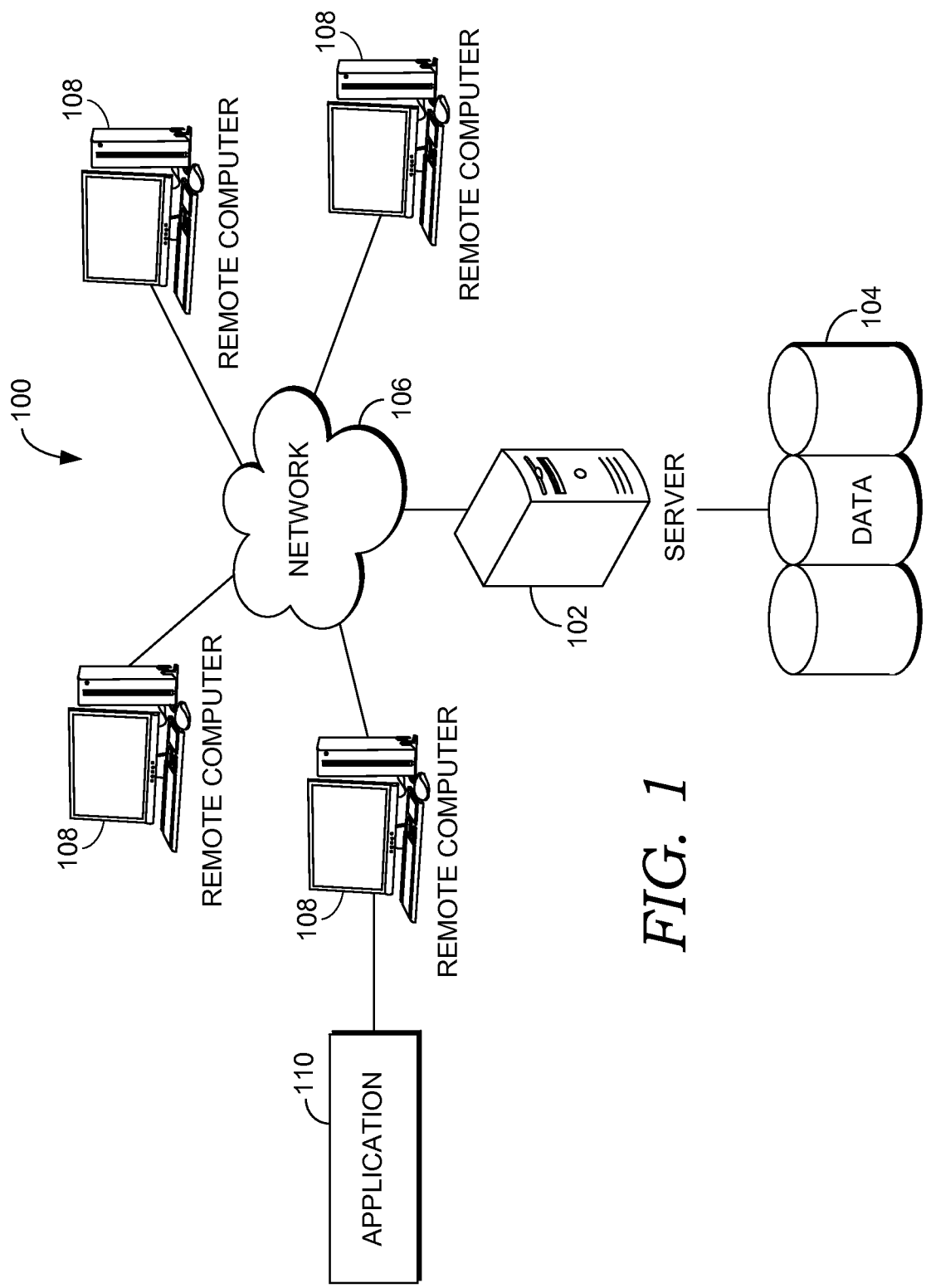
FIG. 1 depicts aspects of an illustrative operating environment suitable for practicing an embodiment of the invention.

The subject matter of embodiments of the present invention is described with specificity herein to meet statutory requirements. However, the description itself is not intended to limit the scope of this patent. Rather, the inventors have contemplated that the claimed subject matter might be embodied in other ways, to include different elements or combinations of elements similar to the ones described in this document, in conjunction with other present or future technologies. Terms should not be interpreted as implying any particular order among or between various steps herein disclosed unless and except when the order of individual steps is explicitly described.

Embodiments may be embodied as, among other things: a method, system, or set of instructions embodied on one or more computer-readable media. Computer-readable media include media implemented for storing information. Examples of stored information include computer-useable instructions, data structures, program modules, and other data representations. By way of example, and not limitation, computer-readable media may comprise computer storage media. Computer-readable media include both volatile and nonvolatile media, removable and non-removable media, and contemplate media readable by a database, a switch, and various other network devices. Media examples include hardware memory devices such as RAM, ROM, EEPROM, flash memory or other memory technology, CD-ROM, digital versatile discs (DVD), holographic media or other optical disc storage, magnetic cassettes, magnetic tape, magnetic disk storage, and other data storage devices. These technologies can store data momentarily, temporarily, or permanently. As used herein, computer-readable media do not include signals per se.

Some embodiments are described herein in terms of records processing systems, such as might be used in driver's license bureau, education registration, an entity, doctor's office, or other clinical setting. However, some embodiments of the invention are not limited to any particular type of medical records processing systems, nor are they limited to medical applications in general. An embodiment may provide contextual help to users of other, non-medically related types of applications.

Various terms are used throughout this description. A full definition of any term can only be gleaned by giving consideration to the full breadth of this document. The term "record" or "chart" is not meant to be limited to any particular type of unified record that stores data for an individual, examples of which include an education record, financial records, government record, an electronic medical record (EMR), electronic health record (EHR), personal health record (PHR), continuity of care record (CCR), among others, or any portion thereof, such as a medication administration record (MAR or eMAR). Furthermore, the terms "individual," "participant," and "person" may be used interchangeably herein to refer to someone who has an individual record.

Accordingly, aspects of the technology described herein are directed to, among other things, providing automatic name translation with high accuracy for individual registration. In brief and at a high level, embodiments of the invention are described herein for instantly translating the full name of a person from his/her native language to English with high accuracy. Embodiments of the present invention enable the user, e.g., registration clerk, to enter the full name of a person in the native language and the system will automatically translate the full name of the person from the native language into English. The high accuracy and the automatic translation of the person's name reduce the amount of time required for registration and avoid having duplicates of people's records due to different errors of name entry in English.

In particular, in the Middle East region, there are 290 million native Arabic speakers, and most of them are not speaking English at high proficiency. On the other hand, most of the systems used in entities and clinics use English as the main language.

In a first aspect, a method is provided for automatic translation of the full name of a person from the native language to an alternative language, i.e., English. The method for inferring person gender and translating people's names into a second language involves: collecting different datasets and databases to provide an input dataset, receiving a person's name in a native language, identifying in the input dataset a relationship between the person's name and genders, identifying in the input dataset a relationship between the person's name in the native language and an alternative name in a second language, calculating the frequency for the relationships between the person's name and genders, calculating the frequency for the relationships between the person's name in the native language and the different alternative names in a second language, calculating certainty scores for pairs of the person's name in the native language and a specific alternative name, calculating certainty scores for pairs of a person's name and a specific gender, sorting the different alternative names and genders in a descending order according to the certainty scores, selecting a specific alternative name with the highest certainty score, selecting the gender for the person's name with the highest certainty score, and serializing and storing the results of selected alternative names and gender of the person's native name.

In a second aspect, a system is provided for automatic translation of the full name of a person from the native language to an alternative language, i.e., English. The system includes one or more databases configured to store the relationships between a native name and genders, and the relationships between the name in the native language and the different names in an alternative language, i.e., English. The system also includes one or more processing devices configured to generate in real time the translated name in English and the gender of the person from the received person's native name.

In a third aspect, computer-readable media are provided for facilitating a method of automatic translation of the full name of a person from the native language to an alternative language, i.e., English. The method for inferring person gender and translating people's names into a second language involves: collecting different datasets and databases to provide an input dataset, receiving a person's name in a native language, identifying in the input dataset a relationship between the person's name and genders, identifying in the input dataset a relationship between the person's name in the native language and an alternative name in a second language, calculating the frequency for the relationships between the person's name and genders, calculating the frequency for the relationships between the person's name in the native language and the different alternative names in a second language, calculating certainty scores for pairs of the person's name in the native language and a specific alternative name, calculating certainty scores for pairs of a person's name and a specific gender, sorting the different alternative names and genders in a descending order according to the certainty scores, selecting a specific alternative name with the highest certainty score, selecting the gender for the person's name with the highest certainty score, and serializing and storing the results of the selected alternative name and gender of the person's native name.

Having briefly described embodiments of the present invention, an exemplary operating environment suitable for use in implementing embodiments of the present invention is described below. Referring to the drawings in general, and initially to FIG. 1 in particular, an exemplary computing system environment, for instance, a medical information computing system, on which embodiments of the present invention may be implemented is illustrated and designated generally as reference numeral 100. It will be understood and appreciated by those of ordinary skill in the art that the illustrated medical information computing system environment 100 is merely an example of one suitable computing environment and is not intended to suggest any limitation as to the scope of use or functionality of the invention. Neither should the medical information computing system environment 100 be interpreted as having any dependency or requirement relating to any single component or combination of components illustrated therein.

The present invention is a special computing environment that can leverage well-known computing system environments or configurations. Examples of well-known computing systems, environments, and/or configurations that may be suitable for use with the present invention include, by way of example only, personal computers, server computers, handheld or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the context of computer-executable instructions, such as program modules, being executed by a computer. Exemplary program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 1, the exemplary computing system environment 100 includes a general-purpose computing device in the form of a server 102. Components of the server 102 may include, without limitation, a processing unit, internal system memory, and a suitable system bus for coupling various system components, including database cluster 104, with the server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 102 typically includes, or has access to, a variety of computer-readable media, for instance, database cluster 104. Computer-readable media can be any available media that may be accessed by server 102, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 102. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 104, provide storage of computer-readable instructions, data structures, program modules, and other data for the server 102.

The server 102 may operate in a computer network 106 using logical connections to one or more remote computers 108. Remote computers 108 may be located at a variety of locations in a registration environment, for example, but not limited to, education, government, financial, clinical laboratories, entities and other in person settings, billing and financial offices, administration settings, etc. The remote computers 108 may also be physically located in nontraditional environments so that the entire community may be capable of integration on the network. The remote computers 108 may be personal computers, servers, routers, network PCs, peer devices, other common network nodes, or the like, and may include some or all of the components described above in relation to the server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the server 102 may include a modem or other means for establishing communications over the WAN, such as the Internet. In a networked environment, program modules or portions thereof may be stored in the server 102, in the database cluster 104, or on any of the remote computers 108. For example, and not by way of limitation, various application programs may reside on the memory associated with any one or more of the remote computers 108. For example, an application program 110 may reside on, and be executed by, server 102 or another server, in which case remote computer 108 would access application 110 remotely. It will be appreciated by those of ordinary skill in the art that the network connections shown are exemplary and other means of establishing a communications link between the computers (e.g., server 102 and remote computers 108) may be utilized.

In operation, a user may enter commands and information into the server 102 or convey the commands and information to the server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 102. In addition to a monitor, the server 102 and/or remote computers 108 may include other peripheral output devices, such as speakers and a printer.

Although many other internal components of the server 102 and the remote computers 108 are not shown, those of ordinary skill in the art will appreciate that such components and their interconnection are well known. Accordingly, additional details concerning the internal construction of the server 102 and the remote computers 108 are not further disclosed herein.

Figure 2:
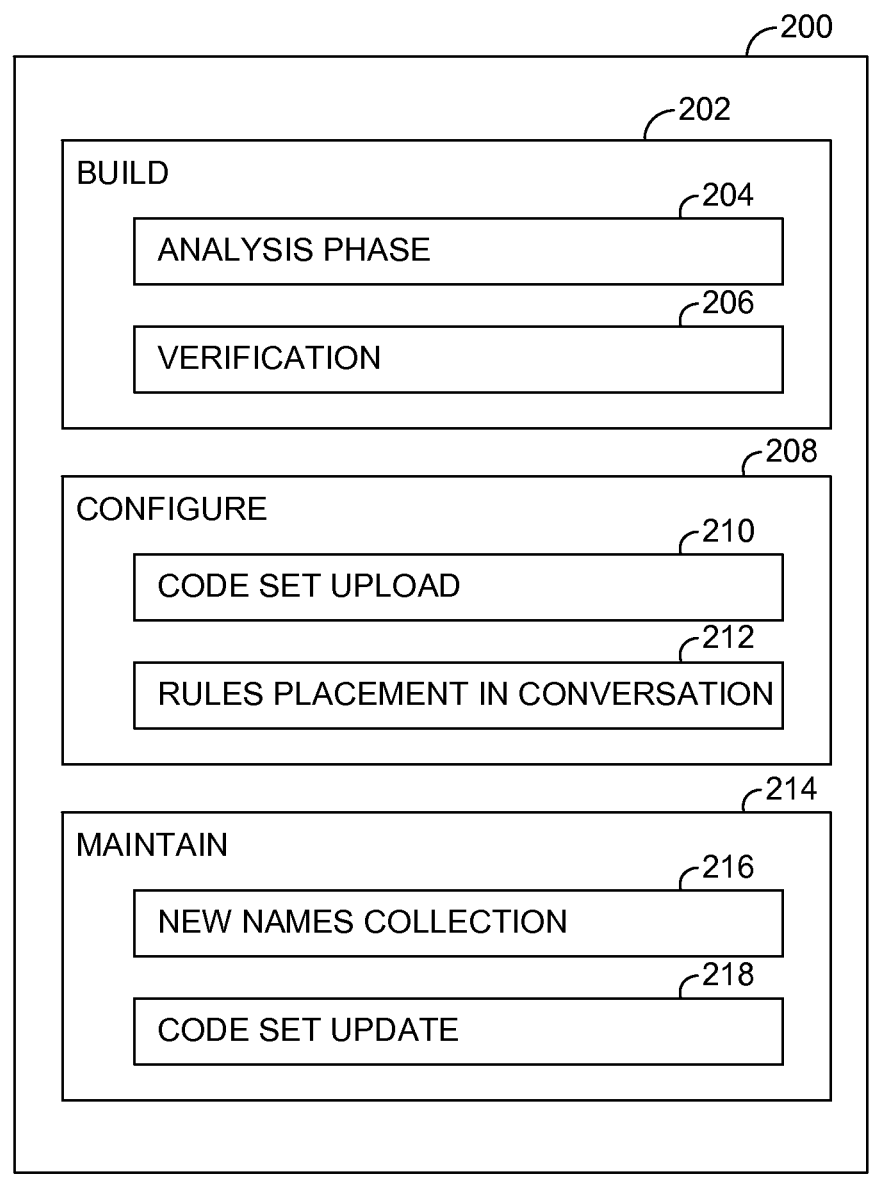
FIG. 2 depicts a block diagram of a high level system design or architecture for an embodiment of the invention.

Turning now to FIG. 2, block diagram 200 depicts a high-level system design or architecture for the embodiments of the present invention. The system 200 comprises three major phases "Build" 202, "Configure" 208, and "Maintain" 214. The "Build" phase 202 is designed to build the input dataset required for the whole system 200. It consists of two sub-parts which are the "Analysis Phase" 204 and the "Verification" phase 206.

The "Analysis Phase" 204 is a machine learning phase that is done entirely via a script Like most machine learning techniques, the program must be fed with datasets to analyze and to learn from. Because machine analyses and machine learning generate decisions with certainty that could range from 40-70 percent or sometimes even up to 80-90 percent, these percentages are not reliable or acceptable to use within any medical domains or environments. For the criticality of medical environments and the safety of the persons, an extremely high level of certainty, up to 99 percent, must be provided and reduce the uncertainty to below 0.1 percent. This is of course a high level of certainty especially in machine learning techniques. This high level of certainty is enforced and ensured by using the second phase of the system 200 named "Verification" 206. This verification technique, in one embodiment, provides a verified "Machine Learning" artificial intelligence approach.

The "Verification" phase 206 is important because it represents the agreement and the verification of correctness of the system. Also, it overcomes political concerns that it shall never be involved in. For example, Saudi Arabia would like to translate the name "محمد" as "Mohammed" while Iran would consider the correct translation "Muhamet." While the program will generate an output with high certainties for translating names and detecting genders, these results culturally vary based on the input datasets fed to the program. Also, "Verification" 206 will be extremely easy because the program will collect and gather data then recommend the final results to the user. The user will only have to review quickly and provide agreement with the results generated by the program. The estimated time for the "Analysis Phase" 204 is 10 minutes and for the "Verification" phase 206 is 1 week.

The second major phase is the "Configure" phase 208 which comprises two sub-parts, the "Code Set Upload" 210 and "Rules Placement in Conversations" 212. The "Code Set Upload" phase 210 is simply to create a new code set, and upload the final supervised outputted data structure. After that comes the "Rules Placement in Conversation" 212 configuration in which certain rules in the registration conversations are placed, i.e., add person, in quick ED registration and full ED registration to automate the translation of individual names (and optionally detect individual genders) in the extremely crowded registration areas to save time and provide a better outcome.

The third and last major phase is the "Maintain" phase 214 which is a continuous phase and it shall be done by the user. It consists of two continuous parts, which are "New Names Collection" 216 and "Code Set Update" 218. Sometimes, the program would fail to translate a person's name because sometimes an extremely strange name would emerge that has never appeared in any dataset. Although, this will be rare, such as parents who wanted to name their baby "Apple" or "Banana" which will be a very rare human name. This step will make sure to capture such cases. Later, the "Code Set Update" 218 can be done to teach the system how to translate such rare names. As a result of a field experiment, only five new names are gathered that the system didn't translate in a period of three months. If the entity receives 500 persons per day, then this means the system was successfully able to translate the name for 44,995 persons and couldn't translate names for five persons for which the registration clerks had to use manual translation. This makes the system reliable 99.999% and significantly minimizes manual tasks and time spent doing so. Both continuous parts of "New Names Collection" 216 and "Code Set Update" 218 could run automatically without human intervention, where the system automatically sends an email or a notification to the user once the system fails to translate a name or once a new name is found.

As discussed above, the "Analysis Phase" 204 is a machine learning phase which requires a large dataset or database for high efficiency and certainty. To prepare and collect datasets to use as an input for the "Analysis Phase" 204, different identification databases can be used.

Figure 3:
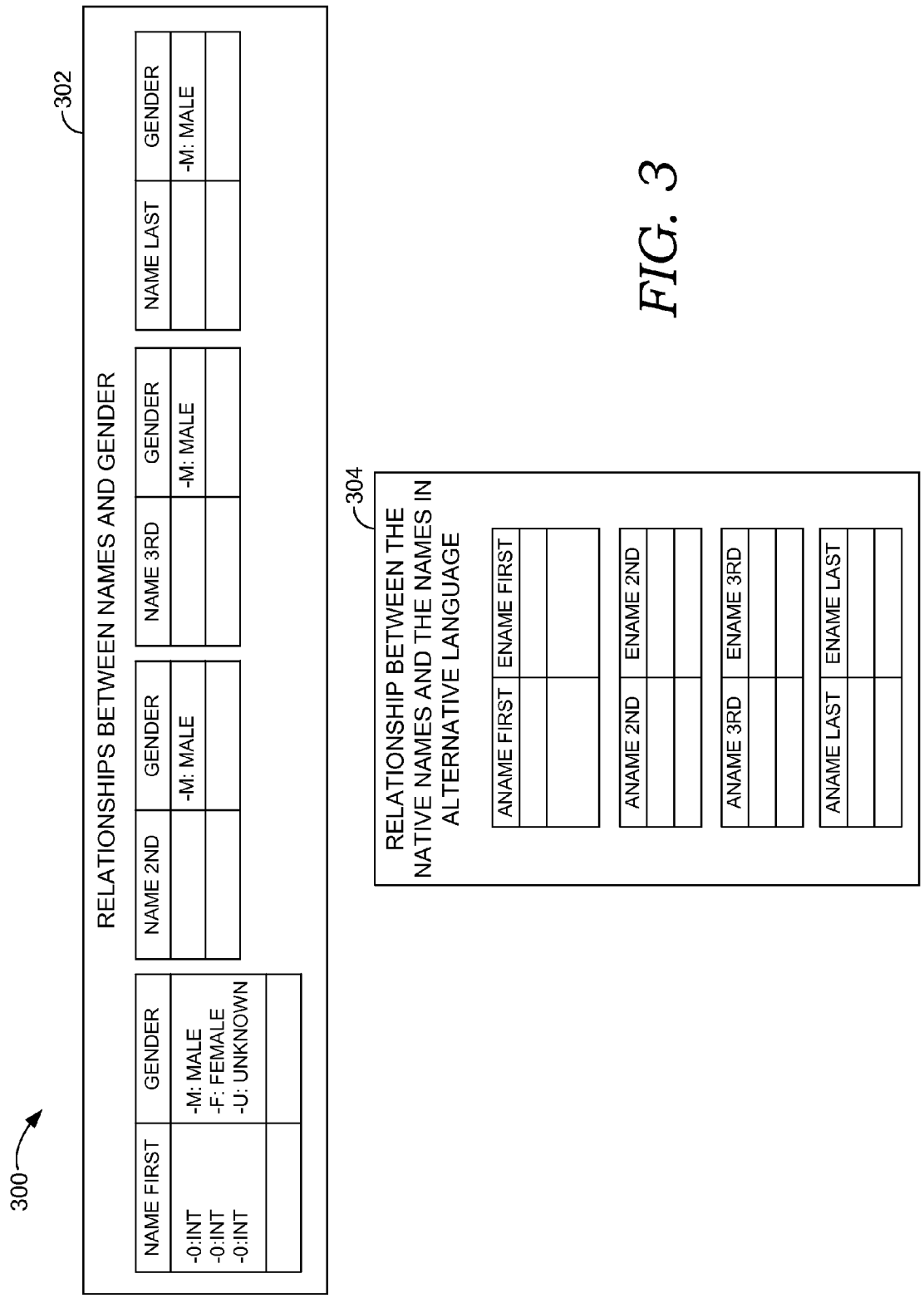
FIG. 3 depicts a diagram illustrating the relationships between different names in the native language and the name translation in the alternative language.

Referring now to FIG. 3, diagram 300 depicts the different relationships between different names and gender 302 and relationships between names in the native language, e.g., Arabic, and translated names in the alternative, e.g., English, languages 304.

Specially designed queries can crawl through the random data available in the input dataset and databases to generate the different relationships mentioned in FIG. 3. Using the different entries in the used dataset or database, a relationship between the available names and the gender of each name will be extracted. As shown in diagram 302, the first name could be male, female, or unknown, but the second, third, and last names in different cultures are usually male names. Hence, in the case of second, third, and last names, different relationships between different names and their known gender are established. Turning now to diagram 304, the relationships between different names in the native language, e.g., Arabic, and the name translation in the alternative language, e.g. English, is depicted. The system will record the relationship between the first name in Arabic, i.e., ANAME First, and its translation in English, i.e., ENAME First. The more data in the input dataset or database, the more sets of relationships between different names in the native language and its English translation can be available for the system.

The available data in the input dataset or database is random data that were previously collected so it may contain many mistakes with regard to name translations or Name-Gender relationships. To minimize the error level (number of mistakes) in the created Knowledge Database, the "Analysis Phase" 204 is followed by the "Verification" phase 206. Verification along with calculated certainty scores (which will be discussed in detail below) are used to determine final data and relationships to be used in the Knowledge Database.

The input dataset or database has different names that may be translated to English in different ways. For example, Egyptians write Ahmed with the letter "e," while Syrians write Ahmad with the letter "a." Therefore, the same name in Arabic may have different translations in English, which may cause duplication of the profile for the same person. To overcome the problem of different translations to the same native name, frequency of each translated name associated with the native name is calculated. Frequency plays an important role in determining the certainty of a true and a correct decision. For example, if more people tend to write Ahmed with letter "e" than people writing it as Ahmad with letter "a," then this somehow implies there is more agreement among people culturally to use the letter "e" than "a" when translating and writing Ahmed. Frequency is one factor that is considered while calculating certainty scores but there are other factors such as verification that has a high rank to the translated names that went through a previous revision or an expert reviewed and labeled them. To add to this complexity, the Arabic language is a diacritized language, and unfortunately, diacritics are rarely used in current Arabic writing conventions. An Arabic diacritic is called Tashkil (marks used as phonetic guides) and it is optional to represent missing vowels and consonant length. Many words in Arabic are homographic but have different meanings and different pronunciation.

As a prerequisite to certainty score calculation, the system calculates the frequency of a name entity (either native or alternative), the frequency of a relationship between a certain name and gender, and the frequency of a relationship between both native name, e.g., Arabic name, and alternative name, e.g., English name. The system compiles all the collected information and uses it to fill in the complicated data structure that is used.

Figure 4:
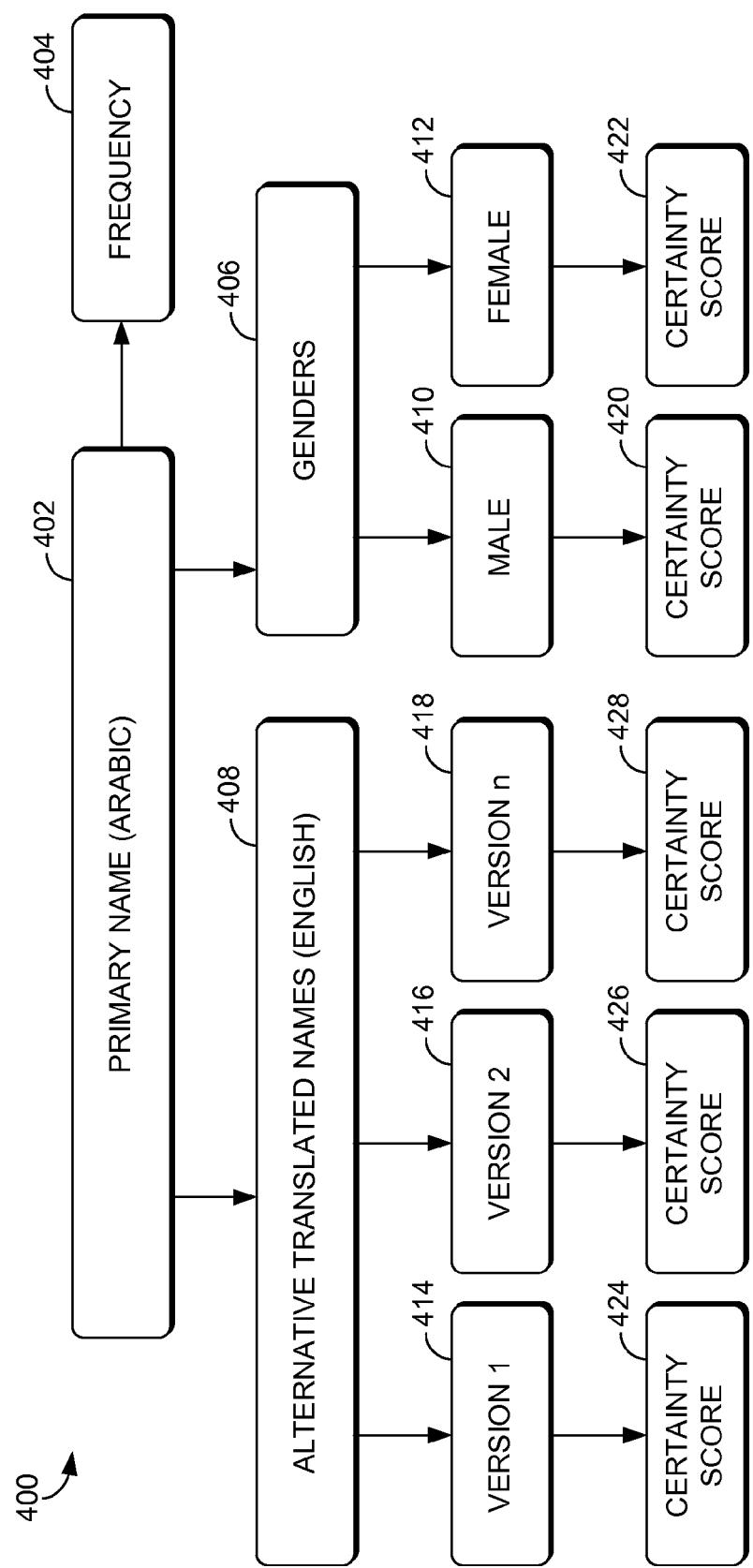
FIG. 4 depicts a flow diagram illustrating an array of data structure used which represents a single native name analysis.

Turning now to FIG. 4, diagram 400 depicts an array of data structure which represents a single native name analysis. For example, assume to analyze the native name "محمد" then its Unicode value shall be considered the primary key 402 in the array. Then to calculate the frequency 404 of how many times "محمد" appeared in the dataset or the database. Then go one level deeper in the data structure of "محمد" and record all the gender data 406. If the link between "محمد" and the Male Gender 410 happened 3000 times while the link between "محمد" and Female Gender 412 happened 3 times, then it is clear for the system that "محمد" is a name of a male. Then the system will infer the male gender from the native name. On parallel, the same is done for the alternative names, e.g., English names, 408. Hence, "محمد" will own a sub-array that records all the different translated versions in the alternative language such as English for the native name "محمد". That sub-array will record the frequency for each translated version 414-418. For example, "Mohamed" would have appeared 100 times, "Muhammud" would have appeared 10 times, "Mohamud" would have appeared 20 times, "Muhamet" would have appeared 1 time, "Mohammed" would have appeared 3000 times, etc. Now, the system is done with the frequency capturing phase and ready to feed the collected information to the next phase which is the certainty score calculation phase.

At the certainty score calculation phase, the system calculates certainty scores for pairs of a native name and a specific alternative name or native name and a specific gender. These certainty scores determine which alternative name, i.e., English name, from the many alternative names to select for a specific native name, i.e., Arabic name. The native name of a person is written uniquely on a person's national ID in his/her native language so the objective is to use that as a primary key 402 and link it to only one gender and one alternative name. A heuristic function may be used to calculate a certainty score as follows:

$$\text{Certainty}(NativeAlternative) =$$
$$\text{Frequency}(NativeAlternative) \times \text{Frequency}(Alternative)$$

$$\text{Certainty}(gender) =$$
$$\frac{(Freq(\text{native}_{gender}) \leftarrow \text{Sum}(Freq(\text{alternative}_{gender})))}{Freq(\text{name})} + \#\text{Humans}$$

So the certainty score of one pair of Native/Alternative names depends on the frequency of appearance of that pair in the input dataset or database and on the frequency of the alternative name alone in the same input dataset or database. The certainty score of gender of a native name depends on different parameters that include the frequency of the gender recorded for the native name in the input dataset or the database, the sum of the different frequencies of the gender for the alternative name that are recorded in different input datasets or databases, the frequency of the name in the input datasets or databases, and the number of humans that supervised the different datasets or databases to remove any errors or mistakes.

Figure 5:
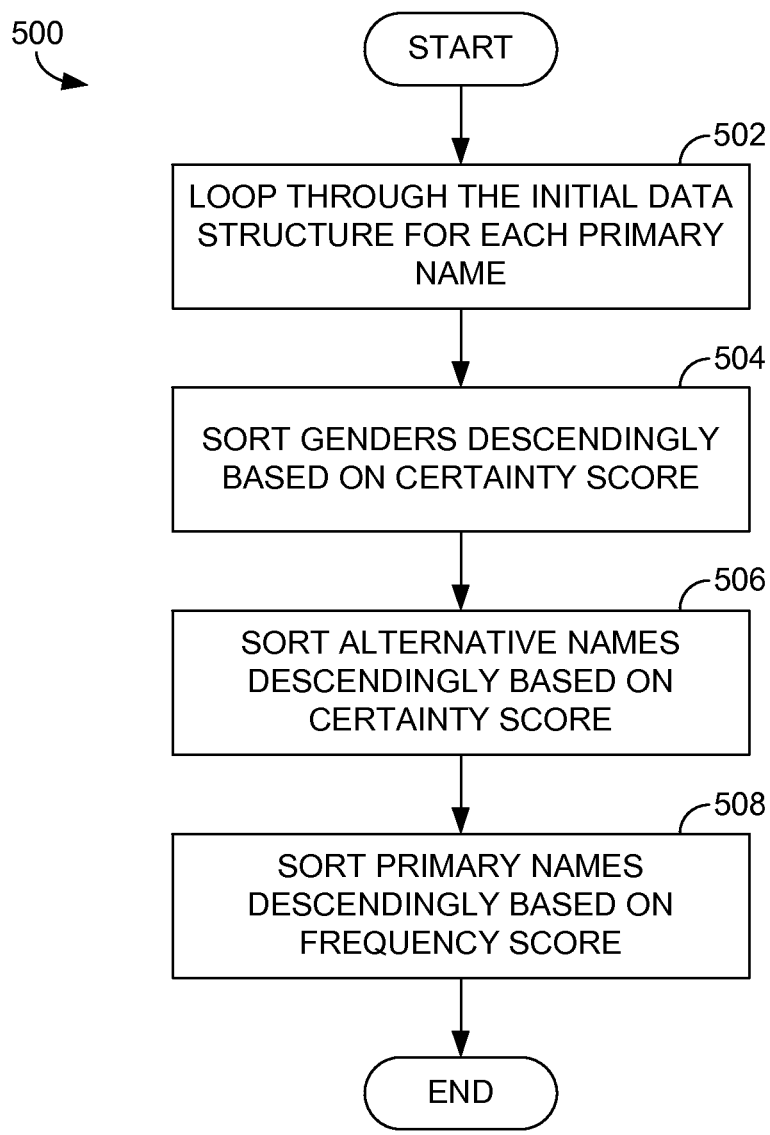
FIG. 5 depicts a flow diagram illustrating the different steps of the sorting phase.

Referring now to FIG. 5, flow diagram 500 depicts the different steps of the sorting phase. At the sorting phase 500, the system will sort the Native Names, the Alternative Names, and the Genders. At a step 502, the system loops through each native name data structure and sorts both its gender and alternative names sub-arrays in a descending order based on their certainty scores. At a step 504, the system sorts the genders sub-array for the native name under processing in a descending order to reflect the most certain gender first. At a step 506, the system loops through each single snapshot and sort its sub-arrays of alternative names in a descending order with the alternative translated name with the highest certainty score appearing first in the sub-array of the native name currently under processing. At a step 508, the system sorts the array of different snapshots in a descending order based on the native name frequency which gives the snapshots of most common names first.

Figure 6:
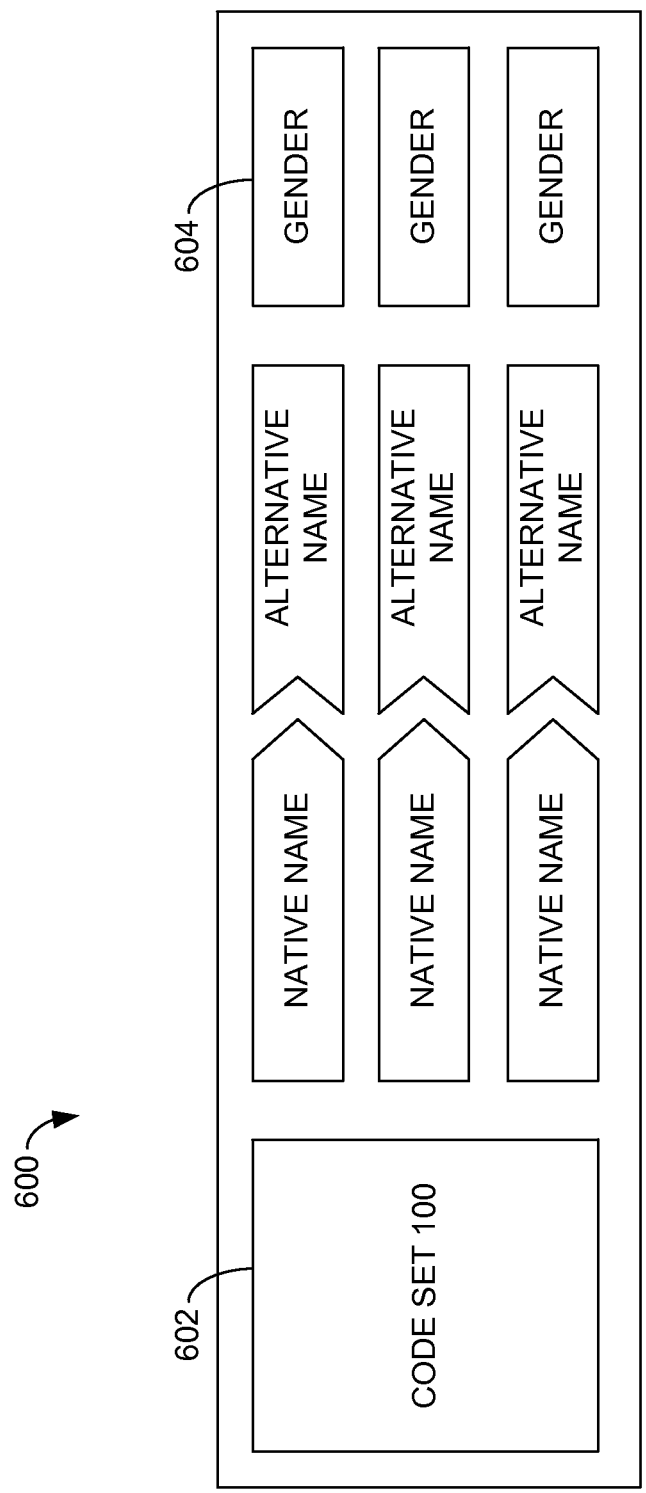
FIG. 6 depicts a diagram illustrating storing the results of knowledge base as a tabular data.

By the end of the sorting phase 500, the Knowledge Base Serialization phase starts in which the system loops through all names and selects only one alternative name and one gender for every native name. This selection shall be based on the best certainty score that corresponds to the first one in the sub-arrays. Turning now to FIG. 6, diagram 600 depicts storing the results of knowledge base as a tabular data comprising three columns of related Native name, Alternative name, and the Gender. The system then serializes the knowledge base results by either saving them to local disk or directly uploading them to a code set such as "Code set 100" 602. Verification takes place and the knowledge base data collection is reviewed and accepted. During the registration process, this knowledge base will act like names expert to automatically translate a name and/or optionally detect a gender.

The size of the whole final data or knowledge base will be less than the size of one single song. In most cases, the knowledge base will not exceed a few megabytes. A single megabyte is 1,048,576 byte or 1024 kilobyte. Then, a single megabyte can store 1,048,576 byte of information. In other words, if an ASCII character takes 1 byte, then the system can store more than 1 million characters per single megabyte. If the number of letters of a single name on average is 5 letters, then we can store 209,715 names using a knowledge base size of 1 megabyte. The system of the present invention has a low overhead, needs low economic resources, and has a great performance since one single query per person runs on 0.001 second. This renders the system of the present invention highly efficient and reliable from a computer's CPU and memory resources perspective.

Figure 7:
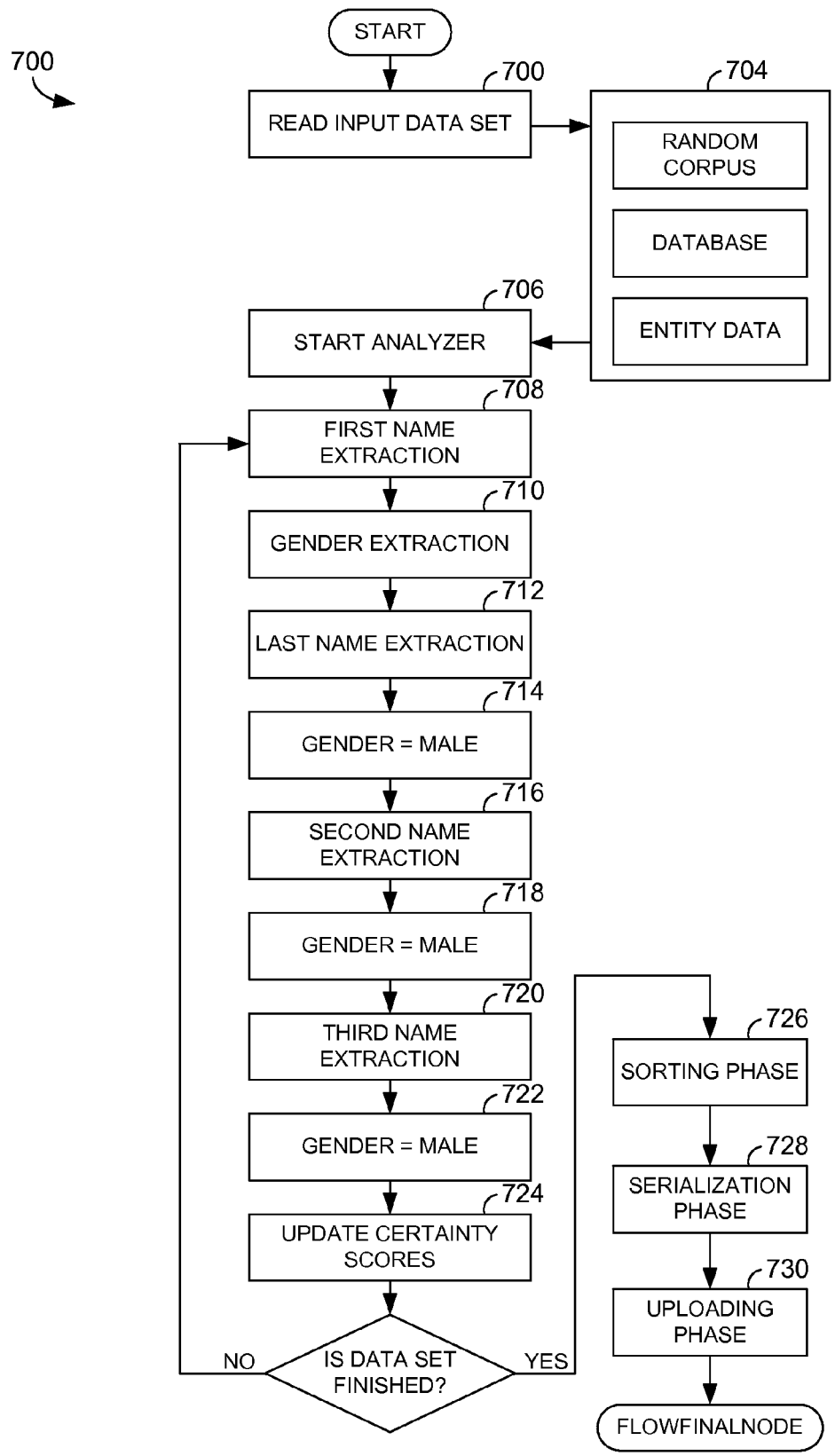
FIG. 7 depicts a flowchart illustrating a method of inferring person gender and translating a person's name into a second language, in accordance with an embodiment of the invention.

Turning now to FIG. 7, diagram 700 depicts a flowchart of the method of inferring person gender and translating people's names into a second language. At step 702, the system starts to read the input dataset which means that a user, e.g., a registration clerk at ED, starts to enter the name of a person in the native language. At step 704, the system accesses different datasets and databases using the person's native name as the input dataset. At step 706, the "Analysis Phase" starts where the system uses the person's first native name to extract the translated or alternative first name that pairs with that native first name in the different datasets or databases. As discussed above, the system may extract different alternative names that pair with the input native first name. The frequency for each alternative first name found is calculated. At step 710, the genders associated with the person's first name are extracted from the datasets or databases. The frequency of each gender extracted is calculated. At step 712, the system extracts the alternative names that pair with the person's native last name in the different datasets and databases. The frequency for each alternative last name found is calculated. At step 714, the gender of the person's last name is assigned to be male. At step 716, the alternative names that pair with the person's native second name are extracted from the different datasets and databases. The frequency for each alternative second name found is calculated. At step 718, the gender of the person's second name is assigned to be male. At step 720, the system extracts the alternative names that pair with the person's native third name in the different datasets and databases and calculate the frequency for each alternative third name found. At step 722, the gender of the person's third name is assigned to be male. At step 724, the certainty scores for each alternative name or gender is updated so the different alternative names for each native name can be sorted. Calculating the certainty scores depends on the calculated frequency for each alternative name or frequency.

At step 726, the "Sorting Phase" starts where all the extracted alternative names for the native first name are sorted in a descending order with the alternative name with the highest certainty score on the top. The alternative name with the highest certainty score is selected as the Alternative name of the input first name. The same process is repeated for the last, second, and third native names to select the Alternative name with the highest certainty score for each native name. The extracted genders for the first name are sorted in a descending order with the gender with the highest certainty score on the top. The gender with the highest certainty score is selected for the first name. At step 728, the "Serialization Phase" takes place and the data is saved to a local drive where the collected dataset can be reviewed and accepted by a supervisor for high certainty assurance. At step 730, the collected dataset is uploaded, either manually or automatically, into a code set. The uploaded code set can be packed into a package that can be installed directly.

Figure 8:
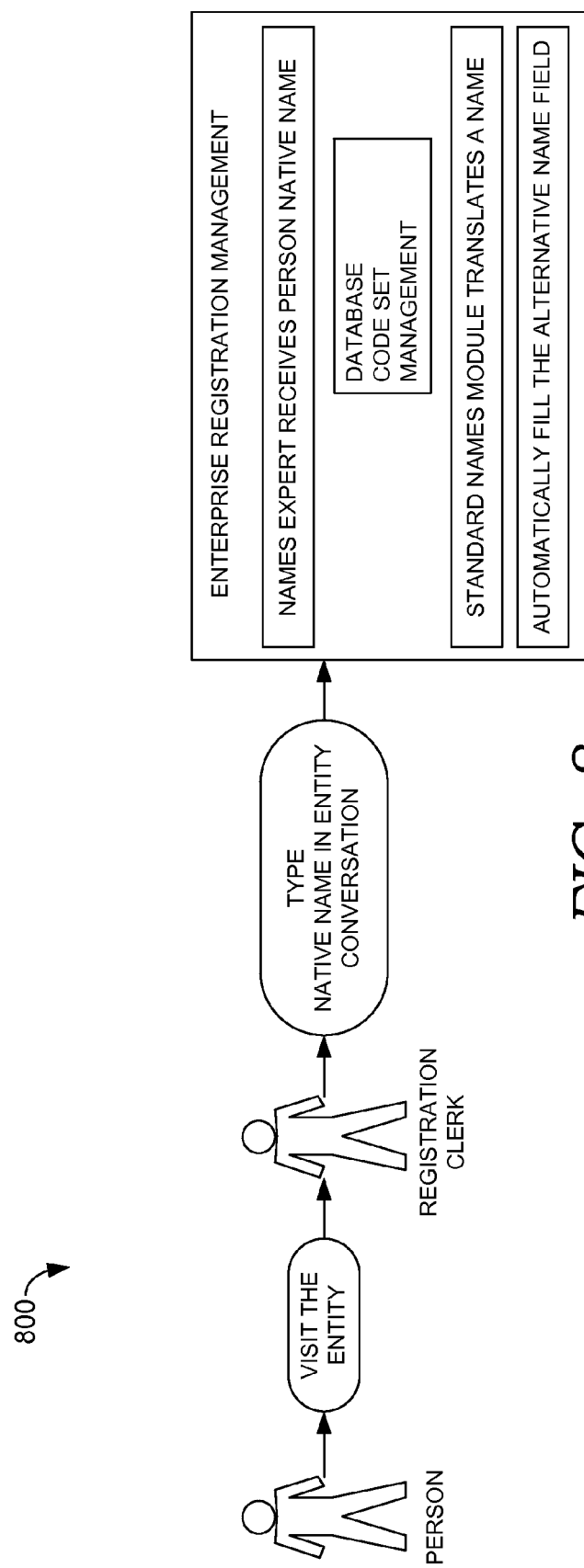
FIG. 8 depicts a flow diagram illustrating the workflow for a person's visit at the registration desk.

Turning now to FIG. 8, sequence diagram 800 depicts the workflow for a person's visit, e.g., to an entity, from end user perspectives. Normally, a person visits the entity and if this was his/her first encounter, the registration clerk will open a new record for him/her. Registering a new person will require the registration clerk to capture all the required and important information such as his/her first name, middle name, and last name in English and in the official language of the country. Also, registration clerks will capture date of birth, gender, IDs, etc. The registration clerk will type a person's name in the entity registration program. Embodiments of the present invention will act as the "Names Expert" inside the entity program and will be able to automatically fill in most of the required fields inside of the conversation with high certainty.

Figure 9:
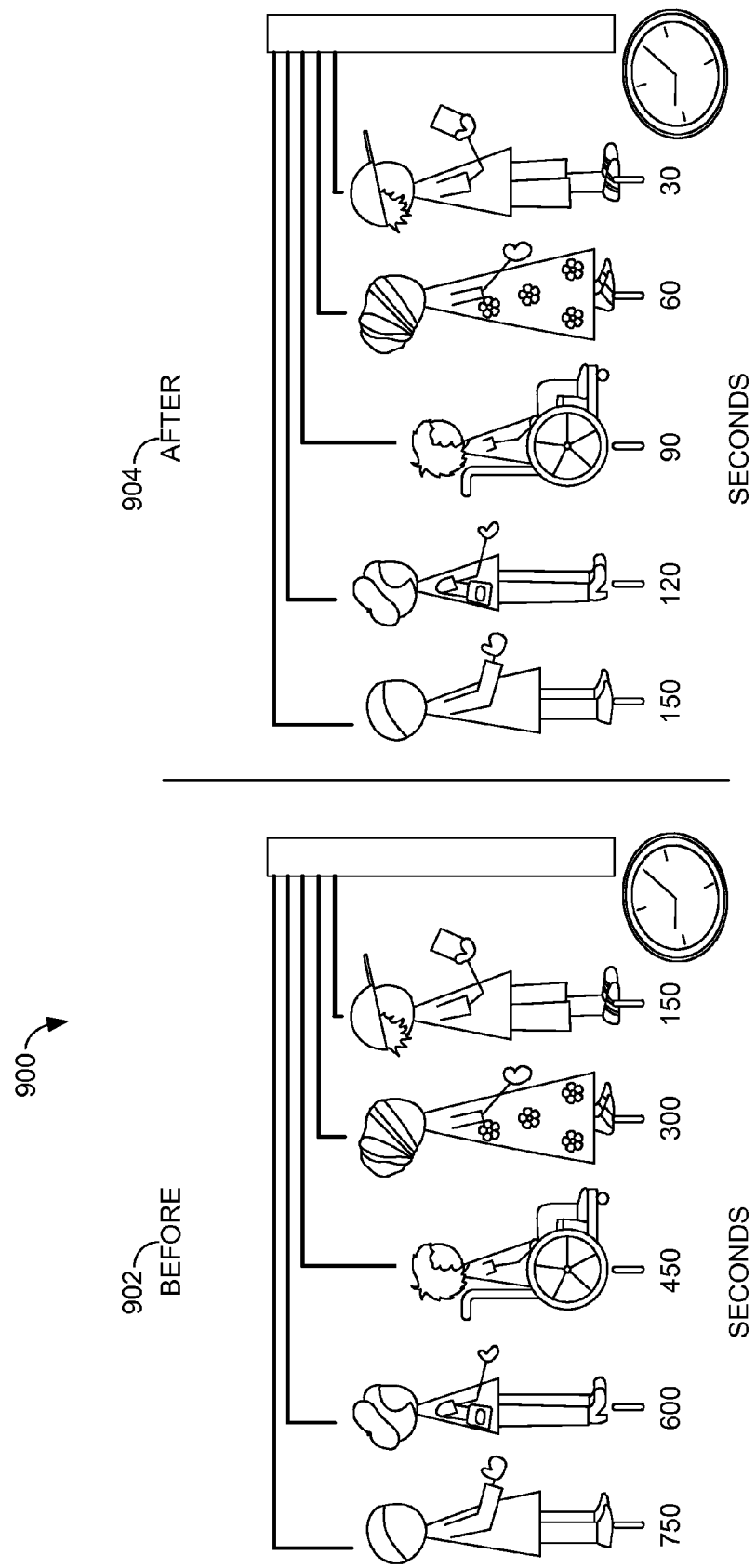
FIG. 9 depicts a diagram illustrating the saved time during the registration process by applying an embodiment of the invention.

Turning now to FIG. 9, diagram 900 depicts the saved time during the registration process by applying the embodiments of the present invention. The embodiments of the present invention have a direct impact on the person waiting time. It reduces the time that the person waits during registration. FIG. 9 illustrates the comparison between "before and after" the implementation of the embodiments of the present invention at the registration desk of an entity. Before the implementation of automatic name translation 902, there are 5 persons in a queue, and the registration process is taking 150 seconds (2:30 minutes) for one person normally. So, the first person takes 2:30 minutes to register, the second person will wait for the first person to finish registration so she ends up with 5 minutes for registration.

The third person will wait for the first and second persons to finish, so he will spend 7:30 minutes to register. The time for registration will accumulate so the fifth person will be done with the registration process after 12:30 minutes. After implementing the automatic name translation 904, the whole registration process for 5 persons will take only 2:30 minutes. The automatic name translation implemented by the embodiments of the present invention proved its effectiveness by reducing registration and waiting time for persons to less than 20%, saving 80% of time for both persons and registration clerks. At main entities, there are usually more than 30 persons in a queue at registration. Assume 2 minutes or (X minutes) are saved on each person, and then the general formula of time saved on person #n would be:

$$F(n)=x*n$$

So in the above example, person number 30 would wait 60 minutes less if automatic name translation implemented by the embodiments of the present invention is in use.

The automatic name translation implemented by the embodiments of the present invention helps entities to maintain one medical record per person as it reduces the chances of having duplicates per one person. Duplicate records for the same person can happen because of flaws in translating a person's name from the native language to English. For example, assume that an entity has a person called "محمد" (Mohammed), and then because of Arabic diacritics there are different possibilities translating the name "محمد" into the English language. Turning now to FIG. 10, table 1000 shows all possible combinations for diacritics used on each of the 4 letters. Hence, each diacritic on each letter changes its English translation. According to the pronunciation table of FIG. 10, each letter could be translated in 7 different ways so for a 4-letter name in Arabic, we have the possibility of 2,401 names in English (7*7*7*7=2401); a name with 5 letters in Arabic, we could have 16,807 possible English names; and for a name with 6 letters in Arabic, we could have 117,649 possible English names. So, "محمد" (Mohammed) came to the entity for the first time and the registration clerk used the highlighted version in the table 1000 to translate the person's name. After a month, Mohammed forgot to bring his health card and he went to another clinic. The new clerk would search for the person's name with a different spelling without any luck to find him so the clerk will create a new medical record for the same person by re-adding him into the system. Therefore, we end up with duplicate records representing the same person so the person's data will become divided over many medical records and not connected. To avoid these divided records, both registration clerks must use the same version of the name. In theory, a 4-letter Arabic name would lead to 2,401 translated English versions. So the probability of choosing one version is 1/2401=0.0004. Then, the probability that the second registration clerk chooses the same version that the first registration clerk used would be 0.00041*0.0004=0.00000016. This means that there is only one chance from 1 million chances that two different registration clerks would use and agree on the same version of an Arabic name. The automatic name translation implemented by the embodiments of the present invention would reduce the chances and probability of making this happen by standardizing the way a specific name is translated into the English language.

In the Middle East, the registration clerk position does not require excellent command of the English language as a prerequisite for applying for the clerk job. The automatic name translation implemented by the embodiments of the present invention will have an effect on the training of the registration clerks as it relieves clerks from guessing how to write down the person's name in English as the system will automatically translate the Arabic name into the English name. The management of the entity will not need to hire new highly educated clerks as the clerk will need to fill in the person's name in Arabic as illustrated in 1102 of FIG. 11. The registration conversation will contain limited options for its required fields unlike the free text with unlimited options for First name, Second/Third name, and Third name required fields. Moreover, once the registration clerk starts to type in the "Arabic First Name" field of FIG. 11, the system will start to type "Arabic Characters" automatically without the need for the registration clerk to switch the keyboard by pressing a certain combination such as "ALT+SHIFT." This saves time for the registration clerk and consequently expedites the registration process.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need to be carried out in the specific order described. Accordingly, the scope of the invention is intended to be limited only by the following claims.

What is claimed is:

1. A computer implemented method comprising:
   automatically collecting different datasets and databases to provide an input dataset;
   feeding the input dataset to a machine-learning analysis program that performs:
      receiving a native name in a native language;
      identify a primary key for the native name in the native language;
      automatically identifying in the input dataset:
         1) one or more relationships between the native name and genders, and
         2) one or more relationships between the native name in the native language and alternative names in a second language;
      automatically calculating a frequency for:
         1) the one or more relationships identified between the native name and genders, and
         2) the one or more relationships identified between the native name in the native language and the alternative names in the second language;
      automatically calculating certainty scores using each of the frequencies of the one or more relationships identified for:
         1) the native name in the native language paired with each of the alternative names in the second language; and
         2) the native name paired with each of the genders;
      building an array data structure to record the certainty scores;
   performing a machine-learning verification of the certainty scores, wherein the machine-learning verification uses an artificial intelligence approach;

sorting the array data structure by looping through the array data structure, wherein the sorting comprises:
automatically sorting each of the alternative names in the second language and genders in a descending order according to the certainty scores;
automatically selecting one of the alternative names in the second language with the highest certainty score and one of the genders with the highest certainty score for the alternative name with the highest certainty score;
linking the primary key of the native name in the native language to the one selected alternative name and the one selected gender;
serializing the sorted array data structure to build a code set for translating names and inferring gender, wherein the serializing comprises:
automatically serializing the certainty score results including the one selected alternative name in the second language and the one selected gender; and
automatically uploading the certainty score results as the code set, wherein the primary key is stored as linked to the one selected alternative name and the one selected gender.

2. The method of claim 1, wherein the native language is Arabic.

3. The method of claim 1, wherein the second language is English.

4. The method of claim 1, wherein each of the frequencies is how many times an object appears in the input dataset.

5. The method of claim 1, wherein the certainty scores further depend on the verification.

6. The method of claim 1, wherein the second language is not the same as the native language.

7. A system comprising:
one or more processing device configured to, for each of a plurality of native names:
automatically collect different datasets and databases to provide an input dataset;
feeding the input dataset to a machine-learning analysis program that performs:
receive a native name in a native language from the plurality of native names;
generate a primary key for the native name in the native language, wherein the primary key comprises a Unicode value or an ASCII value;
automatically identify by crawling the input dataset:
1) one or more relationships between the native name and each of a plurality of genders, and
2) one or more relationships between the native name in the native language and each of a plurality of alternative names in the second language;
automatically calculate a frequency for:
1) each of the one or more relationships identified between the native name and each of the plurality of genders, and
2) each of the one or more relationships identified between the native name in the native language and each of the alternative names in the second language,
wherein each of the frequencies calculated are compiled into an array data structure corresponding to the native name;
automatically calculate certainty scores based on each of the frequencies calculated, wherein the certainty scores are calculated for:
1) the native name in the native language paired with each of the alternative names in the second language; and
2) the native name paired with each of the plurality of genders;
building an array data structure to record the certainty scores;
performing a machine-learning verification of the certainty scores, wherein the machine-learning verification uses an artificial intelligence approach;
sorting the array data structure by looping through the array data structure to:
automatically sort each of the alternative names in the second language and each of the plurality of genders in a descending order according to the certainty scores calculated;
automatically select, for the native name, one of the alternative names in the second language with the highest certainty score and one of the plurality of genders with the highest certainty score for the alternative name with the highest certainty score; and
serializing the sorted array data structure into a code set for translating names and inferring gender, wherein serialization comprises:
automatically serialize certainty score results including the one selected alternative name in the second language and the one selected gender; and
automatically upload the serialized certainty score results as the code set;
one or more databases configured to store the serialized certainty score results for each of the plurality of native names, wherein the primary key is stored as linked to the one selected alternative name in the second language and the one selected gender for each of the plurality of native names.

8. The system of claim 7, wherein the different datasets and databases are collected from entities, wherein the entities include one or more of a hospital or a clinic.

9. The system of claim 7, wherein a computer-based command language is used for searching the input dataset using the native name as a query.

10. One or more non-transitory computer-readable media having embodied thereon computer-useable instructions that, when used by one or more computing devices, cause the one or more computing devices to facilitate a method for inferring gender and translating a name into a second language, the computer storage media comprising:
for each of a plurality of different native names:
automatically collecting different datasets and databases to provide an input dataset;
feeding the input dataset to a machine-learning analysis program that performs:
receiving a native name in a native language from the plurality of different native names;
generating a primary key for the native name in the native language, wherein the primary key is a Unicode value;
automatically identifying by crawling the input dataset:
1) one or more relationships between the native name and a plurality of genders, and
2) one or more relationships between the native name in the native language and alternative names in a second language;
extracting the one or more relationships between the native name and each of the plurality of genders;

extracting the one or more relationships between the native name and each of the alternative names in the second language;

automatically calculating a frequency for:
1) each of the one or more relationships between the native name and the plurality of genders, and
2) each of the one or more relationships between the native name in the native language and the alternative names in the second language;

based on each of the frequencies calculated for the one or more relationships, automatically calculating certainty scores for:
1) the native name in the native language paired with each of the alternative names in the second language, wherein said certainty score is based on the frequency of the native name in the native language paired with each of the alternative names in the second language and the frequency of each of the alternative names alone within the input dataset; and
2) the native name paired with each of the plurality of genders, wherein said certainty score is based on the frequency of the native name paired with the plurality of genders in the input dataset and a sum of each of the frequencies of the alternative names paired with the plurality of genders in the input dataset;

building an array data structure to record the certainty scores;

performing a machine-learning verification of the certainty scores, wherein the machine-learning verification uses an artificial intelligence approach;

sorting the array data structure by looping through the array data structure, wherein the sorting comprises:

automatically sorting each of the alternative names in the second language and each of the plurality of genders in a descending order according to the certainty scores;

automatically selecting one of the alternative names in the second language with the highest certainty score;

automatically selecting, for the native name, one gender in the plurality of genders with the highest certainty score for the one selected alternative name with the highest certainty score;

linking the primary key of the native name in the native language to the one selected alternative name in the second language and the one selected gender;

serializing the sorted array data structure to build a code set for translating names and inferring gender, wherein the serializing comprises:

automatically serializing results of the one selected alternative name in the second language and the selected gender of the native name; and automatically uploading the serialized certainty score results as the code set, wherein the primary key for the native name is stored as linked to the one selected alternative name and the one selected gender.

11. The computer storage media of claim 10, wherein the native language is Arabic.

12. The computer storage media of claim 10, wherein the second language is English.

13. The computer storage media of claim 10, wherein each of the frequencies is a number of times an object is present in the input dataset.

14. The computer storage media of claim 10, wherein the certainty scores depend on each of the frequencies calculated for the one or more relationships and the verification of the certainty scores.

* * * * *